Patented Aug. 23, 1949

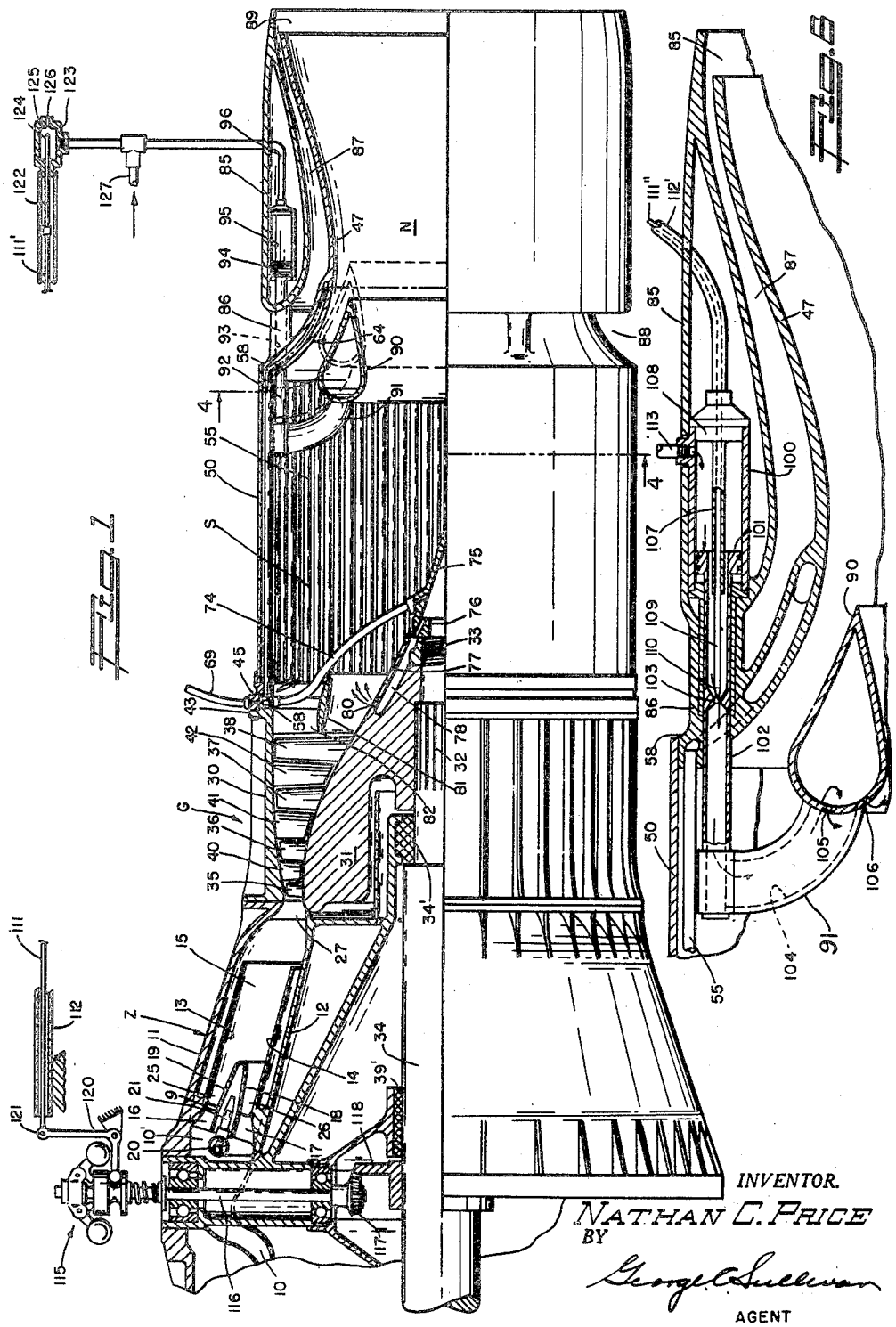

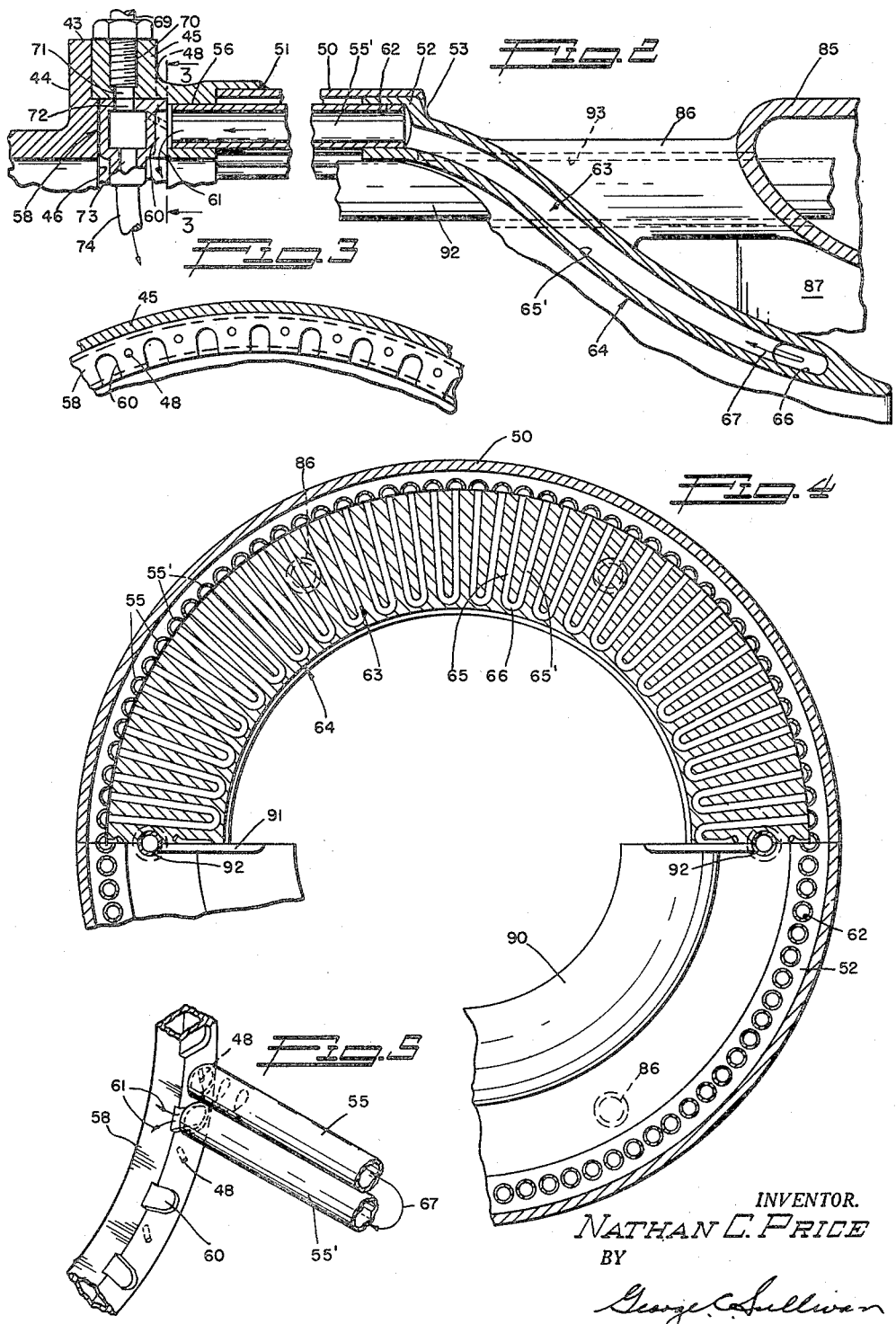

2,479,776

UNITED STATES PATENT OFFICE 2,479,776

TURBO-JET POWER PLANT WITH FUEL VAPORIZER FOR AFTERBURNERS

Nathan C. Price, Hollywood, Calif., assignor to Lockheed Aircraft Corporation, Burbank, Calif.

Application April 15, 1944, Serial No. 531,259

15 Claims. (Cl. 60—35.6)

This invention relates to prime movers of the gas reaction type in general and more particularly to the internal combustion types of engines which function in the manner commonly known as "jet propulsion"; and this application is a continuation-in-part of co-pending application Serial No. 488,029, filed May 22, 1943, now Patent No. 2,468,461, which is, in turn, a continuation-in-part of co-pending application Serial No. 433,599, filed March 6, 1942.

This invention finds its principal application in connection with a jet power plant type of prime mover adapted to be employed in aircraft and like high velocity vehicles, and, particularly, in high altitude airplanes designed for sub-stratosphere or stratosphere flight.

In a jet propulsion unit where the reaction of a rearwardly directed jet of combustion gases is utilized for the propulsive force, a nozzle structure is ordinarily employed for receiving the heated propulsive gases from the combustion chamber and for discharging them efficiently in the form of a high velocity reactive stream. At times it is desirable to augment the thrust and power of the propulsive jet for relatively short periods of time, as when employed in an airplane a sudden burst of speed is required or a period of rapid climb is desired. Heretofore, aircraft driven by external propellers have had the one advantage, over jet propelled aircraft, of requiring less take off distance. This was due to the very high thrust which variable pitch propellers are capable of exerting under static and low speed conditions. This invention, which supplies means to a jet propulsion power plant for effecting an extremely high augmentation of thrust, eliminates the before mentioned disadvantage, to the extent that it now becomes feasible to operate heavily ladened jet propelled aircraft from carrier decks without employing auxiliary propellers or other supplementary take-off assisting means such as catapults, powder rockets, and the like devices.

This thrust augmentation may be effected by the introduction or injection of supplementary fuel into the gases entering the nozzle from the primary combustion zone to support secondary combustion therein with resultant increase in the heat energy of the discharged gases.

In order to effect rapid, complete, and efficient combustion of the secondary fuel in the rapidly flowing stream of exhaust gases discharged from a primary combustion chamber and passing through the relatively short secondary combustion zone in the nozzle, it has been found desirable to pre-heat the fuel to aid atomization and vaporization. It has also been found desirable to employ means to cool the walls of the secondary combustion zone portion of the nozzle and also to cool a portion of the nozzle outlet which is subject to the intense heat of the secondary combustion. In order to accomplish this cooling and at the same time effect heating and vaporization of the liquid fuel, it has been found possible and advantageous to circulate the fuel in indirect heat exchange with the secondary combustion zone and nozzle walls followed by injection of the fuel containing the heat thus removed from the secondary combustion zone and nozzle walls into the secondary combustion zone. Thus the cooling is effected substantially without loss of heat energy as would be the case where an extraneous cooling fluid is employed in an external cooling system which gives up its heat to the air.

It is, accordingly, an object of this invention to provide a means for cooling the walls of a combustion zone substantially without loss of heat to the jet propulsive system.

It is another object of this invention to provide an efficient means for pre-heating liquid fuel for injection into a combustion zone producing a propulsive jet of heated products of combustion.

It is a further object of this invention to provide a novel and improved means for injection of atomized and vaporized liquid fuel into the rapidly flowing stream of combustion gases in a secondary combustion zone of a jet propulsive nozzle.

It is a still further object of the invention to provide a means of increasing the range of thrust obtainable from a jet power plant while maintaining conditions of high plant efficiency and to provide a method of insuring high efficiency during both high and low power outputs.

It is also an object of this invention to provide a jet propulsive aircraft power plant having improved features of construction and durability.

The objects of this invention are, in part, attained by circulating liquid fuel in indirect heat exchange with walls defining the combustion zone and subsequently injecting the heated circulating liquid fuel into gases in a combustion zone which supplies combustion gases to the propulsive jet.

These and other objects and features of novelty will become evident hereinafter in the description which, together with the drawings, illustrate preferred embodiments of the invention.

Figure 1 is a longitudinal view, partially in section, showing the general arrangement of the rear end portion of a jet propulsive power plant including the discharge nozzle.

Figure 2 is an enlarged fragmentary cross-sectional view taken through the secondary combustion zone portion of Figure 1.

Figure 3 is an enlarged fragmentary cross-sectional view taken on line 3—3 of Figure 2.

Figure 4 is a fragmentary cross-sectional view taken on line 4—4 of Figure 1.

Figure 5 is an isometric fragmentary view of the manifolding apparatus shown in Figures 1 and 2.

Figure 6 is an enlarged fragmentary cross-sectional detail view of an alternative control mechanism for the nozzle shown in Figure 1.

Referring now to the drawings in which like reference numerals refer to corresponding parts throughout the several figures, the apparatus of the invention is as follows:

The general arrangement of the apparatus associated with this invention, and which is adapted to be employed in connection with the jet propulsion power plant of the type disclosed in my co-pending application Serial No. 488,029, is best shown in Figure 1, said apparatus comprising as the principal elements thereof, a combustion chamber Z, gas turbine G, secondary combustion zone S, and nozzle N.

The combustion chamber Z which is adapted to receive compressed combustion air from the final stage air compressor through the annular shaped duct 10 and entrance passage 10', is an approximately annular space of slightly diminished average diameter toward its outlet, defined on the outside by the housing 11, and on the inside by a concentric partition 12. A pair of substantially annular shaped and concentrically positioned shroud shield members 13 and 14 are supported at the forward end portion of the combustion chamber and extend rearwardly into the combustion chamber to form therebetween, at 15, an approximately annular shaped combustion zone. At the forward portion of the combustion zone within the shrouds 13 and 14 and supported by means of radial vanes 16 and 17, is a second pair of relatively short, concentrically disposed inner shroud members 18 and 19 extending into the forward portion of the combustion zone 15, said inner shroud members being shaped to converge and join at their inner ends to form, in effect, an open ended approximately annular shaped central fuel nozzle housing.

A plurality of circumferentially spaced fuel and air injection spray jets supported and connected to suitable manifolding 20, contained within the annular entrance space 10, extend approximately axially therefrom into the before mentioned nozzle housing 18—19 located within the entrance to the combustion zone as shown at 21. Each spray jet carries at the inner end a pair of laterally directed orifices which are adapted to direct atomized streams of fuel through registering lateral perforations 9 in the nozzle housing and into the stream of compressed air flowing rearwardly through the approximately Venturi shaped air passages 25 and 26 leading into the combustion zone Z. The combustion chamber converges at the rear end portion to an annular passage 27 which forms the inlet nozzle for the expansion zone of the gas turbine G. The combustion chamber construction just described is substantially the same as that claimed in my copending application, Serial No. 579,757 filed February 26, 1945.

The gas turbine G of the power plant, which is contained within the cylindrical housing section 30, comprises a semi-hollow conoidal shaped rotor 31 which is coaxially and rotatably positioned within the said power plant with the end of minimum diameter facing rearwardly in the direction of flow of the propellant gases to form an expansion zone of increasing cross-sectional area between the said rotor 31 and the inside surface of said housing 30. The turbine rotor 31 is splined at 32 and bolted at 33 onto the rear end of a shaft 34 which is concentrically and rotatably supported upon suitable bearings 34' and 39' within the power unit and makes a driving connection with the combustion air compressors as shown and described in my co-pending application, Serial No. 488,029. The gas turbine rotor carries a plurality of rows of radial impeller blades as shown at 35—38 and a plurality of rows of radial intermediate stator blades are carried by the housing 30 as shown at 40, 41 and 42 in Figure 1.

Located immediately at the rear of the gas turbine and attached at 43 to the gas turbine housing by flanges 44 and 45, as best shown in Figure 2, is a secondary combustion chamber S which terminates in a nozzle section N. The nozzle N has a Venturi shaped throat having a contracted section as shown at 47. The secondary combustion chamber S is defined on the outside by an approximately cylindrical shaped housing shell 50 joined at the forward end to flange 45 by suitable means, such as by welding at 51, and at the rearward end to flange 52 by suitable means such as by crimping and welding at 53. The flanges 45 and 52 are axially perforated as shown at 56 and 62 respectively, to receive in slidable yet substantially fluid tight fit the opposite ends of a plurality of closely spaced axially positioned tubes 55 and 55' positioned side by side in parallel arrangement and sufficiently close together to form a cylindrical or cage-like assembly as best shown in Figures 2 and 4, so as to substantially shield the inner surface of the surrounding shell 50 from contact with the heated gases and from radiational view of the combustion flame in the inner portion of the secondary combustion zone as more fully described hereinafter.

Alternate tubes of the said cylindrically arranged bundle of tubes which pass through the supporting perforations 56 in the forward flange 49 make substantially fluid tight connection at their forward ends through the flange openings or perforations with the rearward face of a square sectioned annular shaped manifold 58 which manifold in turn lies in slidable yet substantially fluid tight fit in an annular recess 46 formed between the coupling flanges 44 and 45, and flush with the adjoining internal cylindrical surfaces of the turbine and secondary combustion chamber housings 30 and 50. Perforations 48 which preferably pass obliquely from the interior through the side walls of the manifold 58 and open into the ends of said tubes 55, as best illustrated in Figure 5, form means for passage of fluid from the manifold 58 into the tubes 55. Every alternate one of the return circulating tubes, as best illustrated at 55' in Figure 5, also makes a substantially fluid tight connection through the flange 45 and with the side of the manifold 58, but each over the closed end of a U shaped recess 60, the inner open end of which is directed radially inward and communicates with the interior portion of the entrance to the secondary combustion zone adjacent the turbine discharge, for introduction of fluid in the manner illustrated by the arrows 61 in Figures 2 and 5.

It will be noted that the type of support afforded the manifold 58 and tubes 55 permits these members to slide with respect to the outer casing, under the influence of differential thermal expansion, as for example when a high rate of supplementary fuel injection is suddenly applied as hereinafter described. This is essential since one of the valuable and novel features of the invention is the provision of a method of changing the thrust of the plant almost instantaneously, as can be accomplished by the system provided.

The opposite rearward ends of the tubes 55 and 55' are supported by and make substantially fluid tight connection in the perforations or sockets 62 formed in the forward face of the before mentioned rearward flange 52. Each pair of adjacent tubes 55 and 55' communicates with and is inter-connected by a looped return duct or channel 63, cast or otherwise suitably formed in the converging portion 64 of the nozzle entrance, each such channel 63 being formed by a pair of inwardly curving longitudinal ducts 65 and 65' interconnected at the inner rearward end by a return bend portion 66. A plurality of such adjacent looped channels, as best shown at 63 in Figure 2 and at 65—65' in Figure 4, are provided around the circumference of the walls of the before mentioned convergent portion 64 of the nozzle N, each of said looped channels making connection with a pair of the before mentioned adjacent circulating tubes 55—55' as just described. Circulation of fluid may thus be effected rearwardly through the tube 55 from the manifold 58, thence through the loop channel 65—66—65' in the direction indicated by arrow 67 in Figures 2 and 5, and return through tube 55' to the recess 60 and thence radially out of the recess discharge opening, into the chamber in the manner indicated by the arrows 61.

The before mentioned manifold 58, retained within the recess 46, formed between the flanges 44 and 45 of the turbine and secondary combustion chamber respectively, is adapted to be supplied with suitable liquid fuel from a fuel supply pipe 69 or a plurality of such fuel pipes through suitable threaded connections 70 in flange 45 and registering apertures 71 and 72 in the flange 45 and manifold 58 respectively.

Fuel feed pipes, preferably in the form of a spider of three such fuel pipes, at 120° angular spacings, extend from the annular manifold 58 as shown at 73 and 74 to a centrally located conically shaped cap member 75 which is positioned adjacent the rear end of the turbine rotor 31 and shaft 34. A cylindrical portion 76 of the cap 75 extends forward into an overhanging surface element 77, which forms the trailing tail surface of the conoidal turbine rotor 31. Fuel introduced into the conical cap 75 by way of said fuel supply pipe 69, manifold 58, and interior fuel pipe spider 74, drops therefrom into the recess 78 under the said surface 77 and, in operation, under the centrifugal force imparted thereto by the rotation of the rotor, the fuel flows forward and upward into the said recess 78 and escapes outward in the form of a mixture of gas and spray through a plurality of radially directed apertures 80. Fuel may thus be simultaneously introduced into the secondary combustion chamber through the outer slot 61 and the rotor apertures 80. This type of fuel distribution simulates the distribution in a free vortex, which is conducive to better fuel distribution and which insures a high rate of heat liberation in a small space. Therefore, a smaller combustion chamber suffices and the loss of unburned fuel from the propulsive nozzle is prevented.

An annular vane 81 is concentrically supported intermediate the turbine rotor and shell opposite the fuel injection orifices 61 and 80 adjacent the turbine discharge by means of a plurality of radially positioned vanes 82 and serves to direct smoothly the flow of discharge gases from the turbine into the secondary combustion chamber and also serves to receive any unatomized droplets of fuel which may be discharged from the slots and apertures and impinge upon the surfaces thereof.

The components of the secondary combustion chamber S are, for the most part, fabricated from a ferrous alloy which is high in nickel and chromium content, such as Inconel for example.

The nozzle end portion of the unit through which the secondary combustion chamber S discharges, is constructed, as before mentioned, of a divergent-convergent Venturi shaped passage having a contracted throat portion as shown at 47. The divergent portion of the nozzle contains the before mentioned plurality of fuel passages as best shown at 63 in Figure 2 for cooling. On the exterior of the nozzle end and surrounding a substantial portion thereof, is an annular shaped streamline sectioned enclosing member 85 supported by a plurality of hollow longitudinal struts 86 and separated from the inner lining of the nozzle by an air passage 87. An annular slot 88 is thus formed surrounding the convergent portion of the nozzle and which communicates by way of the said curved passage 87 with the nozzle outlet at 89. The trailing edge of the outer nozzle member 85 extends a short distance beyond the termination of the inner lining of the nozzle N at 89 whereby, in operation, a moderate ejecting effect is obtained which induces circulation of cooling air into the annular slot 88 through the curved passage 87 and outward at 89 into comingled relation with the discharged combustion gases. At a point inside of and adjacent the convergent portion of the nozzle, intermediate the secondary combustion chamber S and the nozzle portion N, is an annular shaped streamline sectioned variable throat member 90. The member 90 is preferably constructed of precision cast cobalt-chromium-tungsten alloy, and in certain instances this member may consist of the alloy cast in a hollow ceramic sheathing to which the alloy adheres, giving the heat resistant ceramic member adequate strength and resiliency. This throat member 90 is supported by a plurality of inwardly curved arms 91 which make connection with the inner ends of a plurality of longitudinal rods 92 which are in turn reciprocably supported in suitable longitudinal guide bearings 93 in the hollow struts 86 and terminate at their inner ends in pistons 94. The piston shown at 94 is contained in a cylinder 95 to which fluid under pressure may be transmitted through a suitable pipe connection 96. The variable throat member 90 is thus longitudinally reciprocable between the limits shown in dotted lines to vary the effective cross-sectional area of the nozzle N by variation of the fluid pressure in the pipe 96.

Referring now primarily to Figure 6, an alternative apparatus is illustrated for actuating and controlling the nozzle throat member 90. Cylinder 100 contains a piston 101 which is carried on the end of the piston rod 102. The said piston rod 102 is hollow and with the exception of the intermediate inner contraction which forms a needle valve seat at 103, interconnects the head of the cylinder through the piston and passage 104 in the arm 91 with the hollow of the throat member 90. A plurality of bleed holes, as shown at 105 and 106 in the throat member 90, serves to vent the cylinder 100 by way of the beforementioned hollow piston 101, rod 102, and arm 91.

A tubular guide 107 extends axially from the inner side of the cylinder head 108 through the piston 101 and into the hollow piston rod 102. A needle valve rod member 109 having a tapered end 110 is reciprocably supported in the tubular guide 107 and is adapted to be adjusted in longitudinal position with respect to the cylinder 100 by means of a Bourdon cable 111" carried in a Bourdon sheath 112' which is attached to the cylinder head 108. The tapered end 110 of the valve rod 109 is adapted, in operation upon sufficient rearward displacement of the rod 102, to enter and substantially close the opening in the contraction 103. Air or other suitable fluid under pressure slightly above that of the gases within the secondary combustion zone is supplied to the head end of the cylinder 100 through a suitable pipe connection 113.

Referring again primarily to Figure 1, 115 is a fly-ball governor which is gear driven on a lateral accessory shaft 116 through bevel gears 117 and 118. The bevel gear 118 is fixed to and driven by the gas turbine shaft 34. A bell crank 120 which is actuatable by the governor is connected at 121 with the end of a suitable control member such as a Bourdon cable 111 which is movably supported in a Bourdon tube 112. The end of the Bourdon wire 111 may be attached for operation of either of the alternative nozzle opening control apparatus shown in Figures 1 or 6. In the case of Figure 1 the Bourdon wire is operatively attached at 111' to the needle rod 122 of a needle valve 123. Upon inward movement of the rod 122 its beveled end 124 is adapted to seat on an outlet valve seat 125 to close the outlet port 126. The valve 123 is connected through suitable tubing 96 with the cylinder 95 and air or other suitable fluid is adapted to be supplied under pressure to the valve 123 and the cylinder 95 through pipe connection 127.

In the case of the apparatus of Figure 6 the Bourdon cable 111 is operatively attached at 111" to the end of the before mentioned valve rod 109.

The operation of the invention is as follows:

Compressed air is introduced from the compressor through the annular shaped duct 10 and entrance 10' and flows into the combustion chamber Z by way of the Venturi shaped passageways 25 and 26 where it first meets and mixes with atomized liquid fuel from the spray nozzles 21. Burning of the fuel-air mixture takes place in the combustion zone 15. The resultant heated products of combustion and air flow out from the combustion chamber Z through the discharge nozzle 27 and into the expansion zone of the gas turbine G. The resultant rotational power from the rotor 31 of the gas turbine G is transmitted back through the shaft 34 to the air compressor in the manner shown and described in connection with my co-pending application, Serial No. 488,029.

The turbine exhaust gases flow on from the turbine exhaust through the passages formed on either side of the streamlined baffle 81 where, when supplementary fuel is being injected, said gases meet and mix with vaporized fuel entering through the plurality of slots 60 and with vaporized and some unvaporized fuel entering through the rotor orifices 80. Spontaneous combustion of the air-fuel mixture takes place in the forward portion of the secondary combustion zone S and the heat given up by conduction from the gases and by radiation from the combustion flame to the tubes 55 and 55' may be absorbed in fuel circulating therein. The tubes 55 act as heat absorbing bodies with respect to the turbine buckets facing the tubes which results in somewhat reducing the temperature of the last stage turbine buckets. The intermediate curtain of secondary fuel vapor issuing from the intermediately positioned injection orifices 60 and 80 also tends to blanket return radiation to the turbine from the combustion zone. When injection of supplementary fuel is desired, fuel is introduced through the supply pipe 69 into the annular shaped, square sectioned manifold 58, whence it flows through the oblique apertures 48 into the fuel heating tubes 55, thence rearward to the loop duct 63 through the passages 65 and 65' and returned through the pipe 55' to the manifold slot 60 where the gasified fuel escapes at relatively high velocity radially inward into the combustion gases flowing from the turbine discharge to the secondary combustion zone S. That portion of the liquid fuel which is introduced into the annular manifold 58 and which does not pass through the orifices 48 into the heating tubes 55, flows into the inner feed pipes 74 which lead to the turbine rotor cone 75. This fuel, which is as yet unvaporized, swirls with rotation of the turbine wheel into the overhanging trailing edge of the rotor member 77 and under the centrifugal force imparted to it by the rotation of the rotor 31, moves upward and outward through the recess 78 from which it is finally discharged in a spray at high velocity through the plurality of orifices 80 to comingle with the turbine exhaust gases in the form of a free vortex as before mentioned. The before mentioned apertures 48, interconnecting the manifold 58 and the tubes 55, are obliquely positioned so as to introduce fuel into the end of the tube with sufficient tangential velocity to impart spiral flow in the immediate forward ends of these tubes in order to insure complete initial inner surface contact.

It will be apparent from the described details that the various fuel conduits cooperating to effect injection of fuel into the combustion zone are so supported that differential thermal expansion is permitted in these parts without restraint so that thermal stresses are minimized. Also the conduits are readily removable to permit cleaning.

The method of fuel admission to longitudinal tubes eliminates the possibility of hot spots developing in metal parts. For example, the intensity of flame sweeping the outside of any particular longitudinal tube is limited by the amount of vaporizing fluid flowing within that tube, which prevents local overheating of individual tubes.

The combustion chamber outer casing which is shielded from radiant heat, absorbs stresses due to contained pressure within the combustion zone while parts subjected directly to radiation do not carry the bursting stresses of the pressure within the chamber. This pressure may reach approximately seventy pounds per square inch at sea level, as a typical example.

The back pressure on the turbine and the secondary combustion zone S is varied in accordance with the variable effective area of the nozzle throat as determined by the corresponding longitudinal position of the movable throat member 90. For efficient operation it is desirable that the effective area of the nozzle N shall be varied to increased or decreased values in accordance with a function of the increase or decrease in the amount of secondary fuel injection, whereby a substantially constant back pressure on the turbine exhaust and a consequent constant rotational speed of the turbine may be maintained.

In operation the variable nozzle throat member 90 will tend to move rearwardly by the drag of the outward flowing combustion gases. Its longitudinal position may thus be determined and controlled by imposing through pipe 96 a suitable opposing pressure upon the rearward surface of piston 94 in the cylinder 95, such pressure being just sufficient to balance the said drag at the desired position. The longitudinal position of the nozzle throat member 90 may thus be readily varied and adjusted. Proper variation of the pressure in cylinder 95 to effect such adjustment of the nozzle throat member 90 may be performed by means of the control of valve 123 by the action of the centrifugal governor 115. The action of the governor is such that an increment of turbine rotational speed will cause the fly-balls of the governor to move outward under the corresponding increment of centrifugal force resulting in counter-clockwise angular displacement of the bell crank 120. Such angular movement of the bell crank 120 acting through the interconnecting cable 111—111' causes movement of the inner end 124 of the needle 122 away from the valve seat 125 to allow pressure fluid to escape in greater volume from the valve discharge 126. The resultant reduction in pressure in pipe 96 and cylinder 95 results in rearward movement of the member 90 to reduce the effective area of the nozzle passage. The resultant increase in back pressure upon the gas turbine tends to reduce its rotational speed in opposition to the before mentioned increment in speed which initiated the hereinbefore described regulatory action. An incremental reduction of turbine speed results in an opposite regulatory action of the governor 115 and pressure regulator valve 123. Regulation to equilibrium between the action of the governor, the back pressure, and turbine speed is thus obtained which tends to hold the turbine to substantially constant speed.

In the case of the apparatus illustrated in Figure 6, the Bourdon cable 111 leading from the centrifugal governor 115 is connected through 111" to the needle valve rod 109. An increment of rotational speed of the turbine results in rearward movement of the needle 109 away from the contraction 103 opening the passage for fluid between the said contraction 103 and the end 110 of the needle rod 109. The fluid supplied to cylinder 100 through connection 113 may thus escape through the clearance between the contraction 103 and end 110 of the rod 109 and flow through the passages in the arm 104 and member 90 to be finally discharged into the nozzle throat through the orifices 105 and 106. The resultant drop in pressure in the head of cylinder 100 allows the piston 101 carrying the rod 102 and the throat member 90 to move rearwardly under the drag force of the combustion gases passing through the nozzle, until the contraction 103 is moved into substantial re-engagement with the end of needle rod 109 under which condition the pressure in cylinder 100 will be re-established to a value sufficient to hold the throat member in the new position. The said throat member will thus follow the movement of the needle rod 109 as actuated by the governor 115 in such a manner as to tend to maintain the gas turbine at a constant speed.

The described combustion chamber and variable nozzle parts are designed, as in a typical case, to operate without injury even though a gas temperature of 4000° F. is reached during burst thrust periods due to injection of supplementary fuel. This is possible by reason of the particular arrangement of fuel injection and fuel vaporizing surfaces, which either directly cool the other parts by conduction and convection, or which act as "black bodies" to absorb heat from heat radiating parts which would otherwise fail by excessive scaling or melting.

Economy of operation is of paramount importance in connection with a jet propulsion unit and, as before stated, the present invention affords a means for effecting the desired cooling of the combustion chamber walls by a cooling fluid in which the heat thus removed from the walls is fed back into the power plant for useful utilization. The features of advantage of this invention are thus that cooling is effected without the usual heat loss penalty. Another important feature of this invention resides in the fact that the supplementary fuel injection as performed by this invention permits the extension of high power plant efficiency over a wide thrust range. The extension of such a wide range of efficiency in the present case is the result of maintaining the rotative speeds of the gas turbine and compressor components of the power plant substantially constant and at optimum values corresponding to the design values for maximum efficiency in the manner hereinbefore described and as shown and described in co-pending application, Serial No. 433,599, while variation of the thrust power is accomplished by control of the quantity of injected supplementary fuel introduced into the turbine exhaust gases in the secondary combustion zone. Minimum cruising power for the power plant of this invention thus ordinarily corresponds to that power obtained when no supplementary fuel is injected, and maximum power is produced when sufficient supplementary fuel is introduced into the secondary combustion zone to consume substantially all of the excess air in the mixed combustion gases and air exhausted from the gas turbine. Intermediate powers are obtained with correspondingly proportional intermediate amounts of introduced supplementary fuel.

The before described method of operation avoids the less desirable, less efficient method of operation usually employed by other jet propulsion power plants where variation of thrust power is accompanied by corresponding variation in the rotative speeds of the gas turbine and compressors. It will be apparent that under such conditions as heretofore employed the lowering of rotative speeds for cruising rates results in lowered compression ratios and in lessened amounts of inducted air flowing through the plant which in turn lowers the plant thermal efficiency and jet efficiency at a time when highest efficiencies and maximum fuel economy are most desired for attaining a maximum cruising range. Such lowered rotative speeds also result in deviations from design conditions which deviations result in lowered blade efficiencies in the compressor and turbine.

It is to be understood that the foregoing is not to be limiting but may include any and all forms of method and apparatus which are included within the scope of the claims.

I claim:

1. In combination with a fluid reactive propulsion unit, a gas turbine casing having a gas exit, a nozzle in spaced downstream relation to said exit and adapted to discharge gases from said gas turbine casing in the form of a propulsive jet, a pressure resistant wall defining a secondary combustion zone interconnecting the exit of said turbine casing and said nozzle, a turbine rotor operating in said casing and cooperating therewith to provide a gas flow area ahead of said secondary combustion zone which is restricted with relation to the flow area provided by said zone, flow tubes within said zone in spaced adjacent relation to said wall to be in heat exchange relation with the gases in said zone and to protect said wall against the radiant heat of said gases, means to flow fuel through said tubes, and fuel discharge means for introducing fuel from said tubes into the gases flowing through said restricted flow area.

2. In combination with a fluid reactive propulsion unit, a gas turbine casing having a gas exit, a nozzle in spaced downstream relation to said exit and adapted to discharge gases from said turbine casing in the form of a propulsive jet, a wall defining a secondary combustion zone interconnecting the exit of said turbine casing and said nozzle, a turbine rotor operating in said casing and cooperating therewith to provide a gas flow area ahead of said secondary combustion zone which is restricted with relation to the flow area provided by said zone, a plurality of flow tubes within said zone arranged in spaced adjacent relation to said wall to protect said wall against radiant heat and to be in heat exchange relation with the gases flowing in said zone, means to flow fuel through said tubes, and fuel injecting means for discharging the vaporized fuel from said tubes into the gases in said restricted gas flow area in a direction substantially normal to the flow of gases through said restricted area.

3. In combination with a fluid reactive propulsion unit, a gas turbine casing having a gas exit, a nozzle in spaced downstream relation to said exit and adapted to discharge gases from said gas turbine casing in the form of a propulsive jet, a pressure resistant wall defining a secondary combustion zone interconnecting the exit of said turbine casing and said nozzle, a turbine rotor operating in said casing and cooperating therewith to provide gas flow area ahead of said secondary combustion zone which is restricted with relation to the flow area provided by said zone, a plurality of flow tubes extending axially in said zone in spaced adjacent relation to one another and to said wall to protect the wall against the radiant heat of the gases in said zone and to be in heat exchange relation with the gases, means to flow fuel through said tubes, and fuel injecting means at the upstream ends of said tubes to introduce vaporized fuel from the tubes into the gases passing through said restricted flow area.

4. In a gas reaction propulsion power plant, the combination of a gas turbine casing having a gas exit, a nozzle in spaced downstream relation to the gas exit of the turbine casing, a tubular wall extending between the exit of the turbine casing and the nozzle and defining a region of diffusion of the turbine gases and constituting a secondary combustion chamber, a turbine rotor operating in said casing and cooperating therewith to provide a gas flow area which is restricted with relation to the flow area provided by said secondary combustion chamber, a tubular series of axially extending fuel vaporizing tubes in spaced adjacent relation to the inner surface of said wall, means for passing fuel through said tubes, and means at the upstream end of said chamber receiving the vaporized fuel from the tubes and discharging it in a direction substantially normal to the direction of gas flow into said restricted flow area.

5. In combination with a fluid reactive propulsion unit, a gas turbine, a nozzle adapted to discharge gases from said turbine in the form of a propulsive jet, an enclosure forming a secondary combustion zone interconnecting the discharge of said turbine and said nozzle, an annular manifold intermediate said turbine and said secondary combustion zone, return bend passages formed in the wall of said nozzle, flow tubes extending from said manifold to the return bend passages and spaced inwardly from the walls of said enclosure to be in heat exchange relation with gases in said enclosure, means to flow fuel into said manifold and through said flow tubes and return bend passages, and means to introduce fuel from said tubes into the gases in said secondary combustion zone.

6. In a gas reaction propulsion power plant, the combination of a gas turbine casing having a gas exit, a nozzle in spaced downstream relation to the gas exit of the turbine casing, a tubular wall extending between the exit of the turbine casing and the nozzle and defining a secondary combustion chamber and a region of the diffusion of the turbine gases, a turbine rotor operating in said casing and cooperating therewith to provide a gas flow area which is restricted with relation to the flow area provided by said secondary combustion chamber, a tubular series of fuel vaporizing tubes lining said wall to be in heat exchange relation with the gases flowing through said chamber, means for flowing fuel through said tubes, and means adjacent the exit of the turbine receiving the vaporized fuel from said tubes and discharging the same into said area of restricted gas flow in a direction substantially normal to the direction of gas flow therethrough, said tubes being spaced from the inner surface of said wall to leave an annular shaped passage for conducting a portion of the turbine gases rearwardly toward the nozzle in heat exchange relation to said tubes.

7. Apparatus according to claim 6 including an annular manifold at one end of said wall having openings slidably receiving the end portions of said tubes whereby the tubes have freedom for thermal expansion and contraction.

8. Apparatus according to claim 6 in which said means for flowing fuel through said tubes includes a manifold having oblique ports discharging the fuel tangentially into the ends of said tubes to effect an initial spiral flow of the fuel over the inside surfaces of said tubes.

9. In combination with a fluid reactive propulsion unit, a gas turbine including a rotor having a passage, a nozzle adapted to discharge gases from said turbine in the form of a propulsive jet, an enclosure forming a secondary combustion zone interconnecting the discharge of said turbine and said nozzle, an annular manifold intermediate said turbine and said secondary combustion zone, a plurality of parallel axially positioned tubes extending along the inner surface of the walls of said secondary combustion zone in heat exchange relation with the gases in said enclosure, means to flow fuel into said manifold and through said tubes, means to introduce a portion of the fuel from said tubes into the gases in said secondary combustion zone, means to conduct another portion of the fuel from said manifold to said passage in the rotor of said turbine, and means to introduce said fuel from said turbine rotor passage into the gases in said secondary combustion zone.

10. In combination with a fluid reactive propulsion unit, a gas turbine including a rotor having a passage, a nozzle adapted to discharge gases from said turbine in the form of a propulsive jet, an enclosure forming a secondary combustion zone interconnecting the discharge of said turbine and said nozzle, an annular manifold intermediate said turbine and said secondary combustion zone, a plurality of flow passages associated with the walls of said enclosure in heat exchange relation with the gases in said enclosure, means to flow fuel into said manifold and through said plurality of flow passages, means to introduce a portion of the fuel from said flow passages into the gases in said secondary combustion zone, means to conduct another portion of the fuel from said passages to said passage in the rotor of said turbine, and means to introduce said fuel from said rotor passage into the gases in said secondary combustion zone.

11. In combination with a fluid reactive propulsion unit, a gas turbine including a rotor having a passage, a nozzle adapted to discharge gases from said turbine in the form of a propulsive jet, an enclosure forming a secondary combustion zone interconnecting the discharge of said turbine and said nozzle, an annular manifold intermediate said turbine and said secondary combustion zone, a plurality of flow passages associated with the walls of said enclosure in heat exchange relation with the gases in said enclosure, means to flow fuel into said manifold and through said plurality of flow passages, means to introduce a portion of the fuel from said flow passages radially inward into the gases in said secondary combustion zone, means to conduct another portion of the fuel from said passages to said passage in the rotor of said turbine, and means to introduce said fuel from said rotor passage tangentially outward into the gases in said secondary combustion zone.

12. In combination with a fluid reactive propulsion unit, a gas turbine, a nozzle adapted to discharge gases from said turbine in the form of a propulsive jet, a conduit forming a secondary combustion zone interconnecting the discharge of said turbine and said nozzle, a plurality of outer fuel inlet ports located intermediate the gas turbine discharge and the secondary combustion zone and adapted to direct sprays of fuel radially inward, and a plurality of inner fuel inlet ports located substantially opposite said outer ports and adapted to direct sprays of fuel radially outward and an annular baffle positioned intermediate said outer and inner ports and coaxial with respect to said gas turbine and secondary combustion zone and means to supply fuel under pressure to said ports.

13. In combination with a fluid reactive propulsion unit, a gas turbine, a nozzle adapted to discharge gases from said turbine in the form of a propulsive jet, a conduit forming a secondary combustion zone interconnecting the discharge of said turbine and said nozzle, a plurality of outer fuel inlet ports located intermediate the gas turbine discharge and the secondary combustion zone and adapted to direct sprays of fuel radially inward, and a plurality of inner fuel inlet ports located in the gas turbine rotor substantially opposite said outer ports and adapted to direct sprays of fuel radially outward and an annular baffle positioned intermediate said outer and inner ports and coaxial with respect to said gas turbine and secondary combustion zone and means to supply fuel under pressure to said ports.

14. Apparatus for use with a fluid reactive propulsion unit having a passage for the exhaust of gases comprising a conduit extending from said passage and defining a combustion chamber, a nozzle at the rear end of the conduit for discharging the gases in the form of a propulsive jet, a fuel manifold of ring form at the forward end of the conduit, pairs of flow tubes extending rearwardly in the conduit from the manifold, means joining the rear ends of the tubes of each pair for the flow of fluid from one to the other, said manifold having alternate metering orifices and recesses, one tube of each pair having its forward end in communication with an orifice to receive fuel therefrom, the other tube of each pair having its forward end in communication with a recess to deliver fuel vapor thereto, said recesses being open to the combustion chamber to discharge the fuel vapor therein, and means for supplying fuel to said manifold for flow through said orifices and tubes and for discharge in vapor form from said recesses for combustion in said zone.

15. Apparatus for use with a fluid reactive propulsion unit having a passage for the exhaust of gases comprising a conduit extending from said passage and defining a combustion chamber, a nozzle at the rear end of the conduit for discharging the gases in the form of a propulsive jet, there being an annular internal groove at the forward end of the conduit, a fuel manifold of ring form arranged in the groove for free independent thermal expansion and contraction, pairs of flow tubes extending rearwardly from the manifold to be in heat transfer relation to the gases in said chamber, means for maintaining the rear ends of the tubes of each pair in communication, the manifold having an orifice for communicating with the forward end of one tube of each pair and having a recess placing the forward end of the other tube of each pair in communication with said chamber, and means for supplying fuel to the manifold for passage through said orifices and flow through said pairs of tubes to discharge from said recesses in the form of vapor.

NATHAN C. PRICE.

(References on following page)

REFERENCES CITED

The following references are of record in the file of this patent:

UNITED STATES PATENTS

| Number | Name | Date |
|---|---|---|
| 271,716 | Kropff | Feb. 6, 1883 |
| 1,405,482 | Bostedo | Feb. 7, 1922 |
| 1,493,157 | Mélot | May 6, 1924 |
| 1,760,118 | Crane | May 27, 1930 |
| 1,766,989 | Forssblad | June 24, 1930 |
| 2,024,274 | Campini | Dec. 17, 1935 |
| 2,203,357 | Kerr | June 4, 1940 |
| 2,280,835 | Lysholm | Apr. 28, 1942 |
| 2,288,140 | Niles | June 30, 1942 |

FOREIGN PATENTS

| Number | Country | Date |
|---|---|---|
| 376,974 | Great Britain | July 21, 1932 |
| 792,596 | France | Oct. 21, 1935 |
| 848,225 | France | July 17, 1939 |

OTHER REFERENCES

"Flight," issue of Oct. 9, 1941, pp. 239 and 242.